Aug. 8, 1950      S. J. WRIGHT      2,518,215
TRACTOR MOUNTED IMPLEMENT
Filed Nov. 4, 1948      2 Sheets-Sheet 1
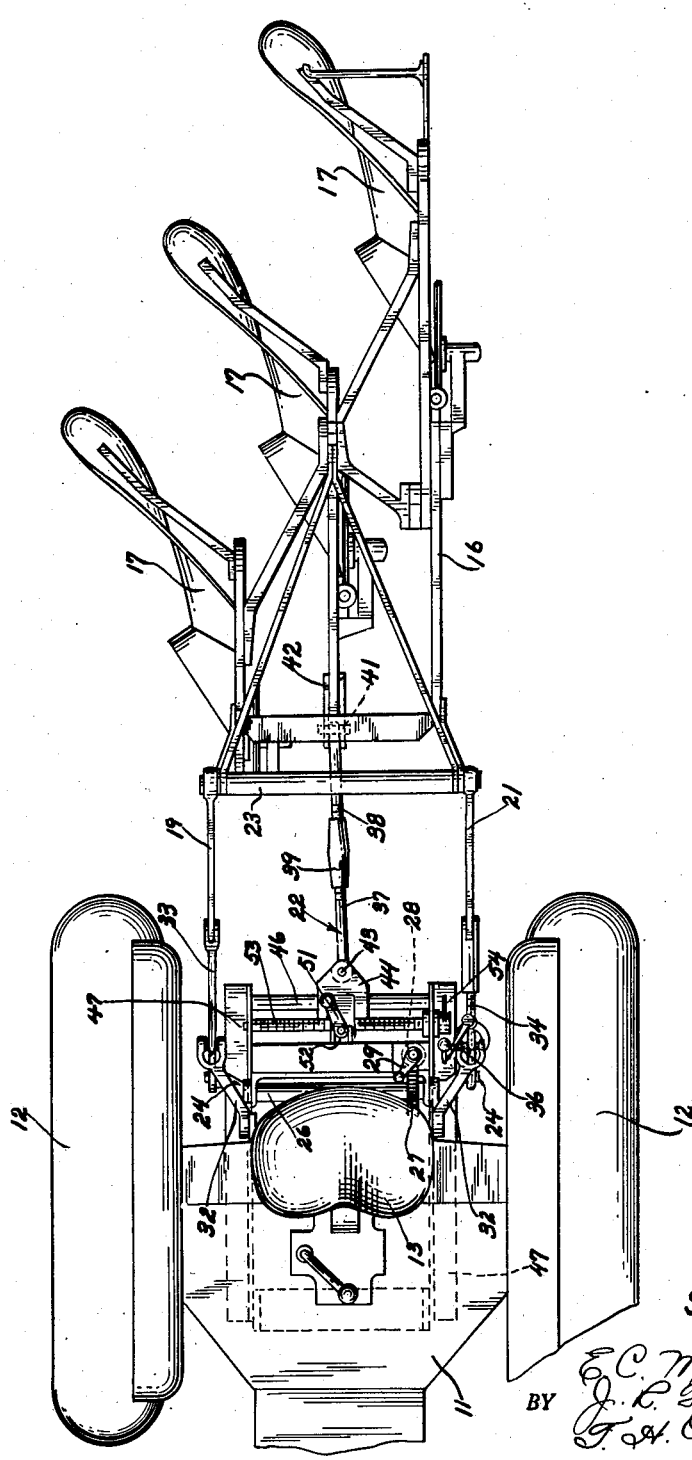
S. J. WRIGHT
INVENTOR.
BY
ATTORNEYS

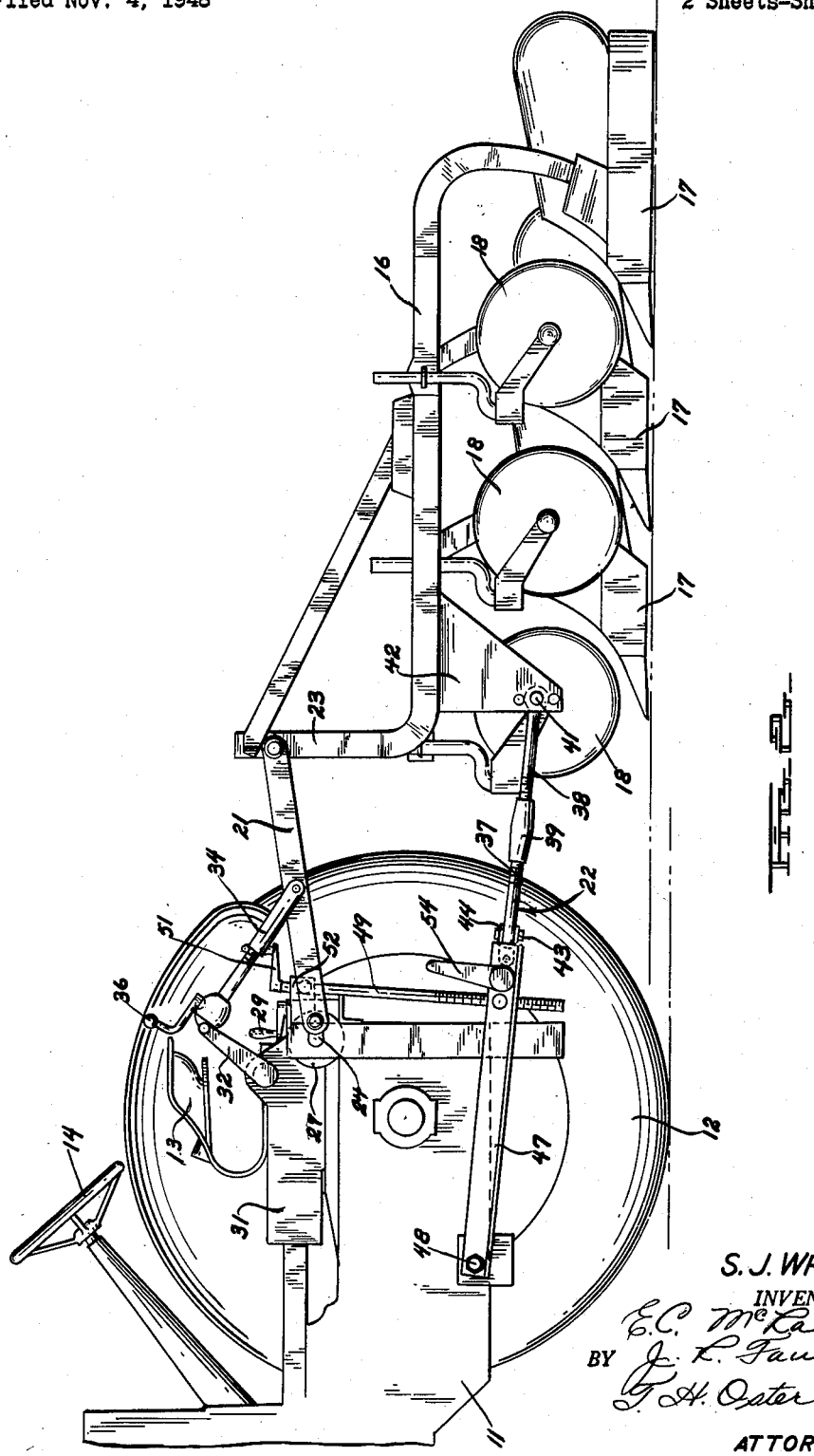

Patented Aug. 8, 1950

2,518,215

UNITED STATES PATENT OFFICE 2,518,215

TRACTOR MOUNTED IMPLEMENT

Samuel John Wright, Great Warley, England, assignor to Ford Motor Company, Dearborn, Mich., a corporation of Delaware Application November 4, 1948, Serial No. 58,344
In Great Britain October 1, 1947

2 Claims. (Cl. 97—50)

1

This invention relates generally to tractors and has particular reference to improvements in the linkage for connecting agricultural implements to tractors.

An object of the present invention is to provide a tractor having a linkage arrangement which will enable the tractive forces necessary to overcome soil, implement weight, and other resistances to be transmitted efficiently between the implement and the tractor.

Preferably the arrangement consists of a three-point linkage system comprising a pair of laterally spaced upper links and a single lower link, with the angular position of the single lower link being adjustable both laterally and vertically, and with lifting means being associated with the two upper links so that the implement may be raised or lowered as desired. The angularly adjustable lower link serves to regulate the working depth of the plow or other soil penetrating implement, and to return the implement to the desired depth should the working depth temporarily change.

It is a further object of the invention to provide the adjustments heretofore mentioned with manually operable controls which may be readily adjusted by the tractor operator.

Other objects and advantages of the invention will be more apparent as this description proceeds, particularly when considered in connection with the accompanying drawings, in which:

Figure 1 is a plan view of a tractor and plow coupled together by the linkage of the present invention.

Figure 2 is a side elevational view of the construction shown in Figure 1.

Referring now to the drawings, the tractor and the implement, shown herein as a plow, are of generally conventional construction, the tractor comprising a main frame or chassis 11 supporting an engine (not shown), a pair of rear driving wheels 12, a driver's seat 13, and steering wheel 14, while the plow comprises a main frame 16 supporting a set of shares 17 and coulters or similar members 18.

The plow is connected to the tractor by a linkage system comprising a pair of laterally spaced upper links 19 and 21 and a single lower link 22. At their rearward end the upper links 19 and 21 are pivotally connected to the vertical extension 23 of the plow frame 16 and at their forward ends are pivotally connected to short crank arms 24 carried at opposite ends of a cross shaft 26 rotatably mounted upon the tractor chassis. The

2 cross shaft 26 carries a worm wheel 27 which is engaged by a worm 28 mounted for rotation about a vertical axis. The worm 28 is adapted to be manually operated by the tractor driver by means of a crank 29, and it will be apparent that by operation of the crank 29 the shaft 26 may be rotated and the crank arms 24 raised or lowered to provide a suitable adjustment for the forward ends of the upper links 19 and 21.

To raise or lower the plow as desired, a conventional hydraulic power cylinder 31 is provided upon the tractor and is operatively connected to a pair of lifting cranks 32 in the well-known manner (not shown). The lifting cranks 32 are connected by means of lift arms 33 and 34 to intermediate portions of the upper links 19 and 21 respectively. It will be apparent that when the hydraulic cylinder 31 is operated the upper links 19 and 21 will be raised or lowered as desired to change the position of the plow. One of the lift arms, in this case 34, is formed of two relatively adjustable parts operated by means of a control handle 36 so that the length of the lift arm may be varied and the angular position of the plow relative to the tractor varied as desired. This permits the plow to be leveled in a lateral direction even though the tractor may be inclined due to one wheel riding in the plowed furrow.

The lower link 22 is formed of two threaded rods 37 and 38 connected together by a threaded sleeve 39 so that its effective length may be increased or decreased by rotating the sleeve 39. At its rearward end the lower link 22 is pivotally connected at 41 to a frame member 42 depending from the main frame 16 of the plow. The forward end of the lower link 22 is pivotally connected at 43 to a bracket 44, the latter being mounted for sliding movement laterally of the tractor upon a cross shaft 46. Opposite ends of the cross shaft are supported at the rearward ends of a pair of longitudinally extending arms 47 located on opposite sides of the tractor chassis 11. The arms 47 are pivotally mounted at their forward ends to the tractor chassis for rotation about a common horizontal laterally extending axis 48. It will be apparent that the arms 47 and the cross shaft 46 carried thereby may be swung vertically to locate the bracket 44 and the forward pivot 43 for the lower link in any desired vertical position. This adjustment is accomplished by means of a vertical threaded control rod 49 which passes through a threaded aperture in the bracket 44 and is rotatably mounted adjacent its upper end in a bracket 52 extending from the tractor frame. The control rod 49 carries an operating handle 51 at its upper end and rotation of this handle by the operator is thus effective to raise and lower the bracket 44 and the forward end of the lower link 22.

It has previously been mentioned that the bracket 44 is laterally slidable upon the cross shaft 46 so that the forward end of the lower link 22 may be adjusted laterally, as desired. This adjustment is effected by means of a threaded transverse control rod 53 threadedly engaging the bracket 44 and having its opposite ends journaled in the side arms 47. A control handle 54 is mounted at one end of the transverse control rod 53 and when operated reciprocates the bracket 44 transversely along the cross shaft 46 and thus adjusts the forward pivot point 43 of the lower link to any desired lateral position.

It will be apparent from the foregoing description that the forward end of the lower link 22 may be adjusted both laterally and vertically as desired. For each position of vertical adjustment of the forward end of the lower link 22, assuming soil conditions to be uniform, the plow will operate at a fixed depth such that equilibrium of the various forces involved is maintained. With a change in the vertical adjustment of the lower link, the plow adjusts itself until equilibrium is again reached at a new depth.

Although I have shown and described certain embodiments of the invention, it will be understood that I do not wish to be limited to the exact construction shown and described, but that various changes and modifications may be made without departing from the spirit and scope of my invention, as defined in the appended claims.

What is claimed is:

1. Means for attaching an implement to a tractor comprising a pair of laterally spaced upper links and a single lower link, each pivotally connected at their rearward end to the implement, crank arms pivotally connecting the forward ends of the two upper links to the tractor, manually adjustable means for rotating said crank arms to vary the points of pivotal connection of said upper links to the tractor, power lift means connected to said upper links to raise and lower the implement, a swinging support mounted for pivotal movement about a horizontal transverse axis, a generally vertically disposed threaded rod mounted upon said tractor and manually rotatable to raise and lower said swinging support, a bracket mounted for transverse movement upon said swinging support, a transversely disposed threaded rod engageable with said bracket to adjust the transverse position of the latter, and means pivotally connecting the forward end of said lower link to said bracket.

2. Means for attaching an implement to a tractor comprising a pair of generally longitudinally extending arms pivotally mounted on opposite sides of said tractor for swinging movement about a common horizontal transverse axis, a cross member extending transversely of said tractor adjacent the rearward end thereof and mounted upon the rearward ends of said arms, a supporting bracket mounted upon said cross member for lateral sliding movement thereon, a horizontally disposed threaded rod having its ends journaled in said arms and positioned adjacent said cross member and having a screw-threaded connection with said supporting bracket to adjust said supporting bracket laterally of said tractor, a vertically disposed threaded rod rotatably mounted adjacent its upper end in a bracket extending from the rearward end of said tractor and having a screw-threaded connection with said supporting bracket, a control handle at the top of said vertical rod for rotating the latter and adjusting said supporting bracket vertically, and a link pivotally connected at its forward end to said supporting bracket and at its rearward end to said implement.

SAMUEL JOHN WRIGHT.

REFERENCES CITED

The following references are of record in the file of this patent:

UNITED STATES PATENTS

| Number | Name | Date |
|---|---|---|
| 663,744 | Felter | Dec. 11, 1900 |
| 1,257,589 | Dickinson | Feb. 26, 1918 |
| 1,916,945 | Ferguson | July 4, 1933 |
| 1,988,157 | Bowen | Jan. 15, 1935 |
| 2,030,567 | Bowen | Feb. 11, 1936 |
| 2,319,670 | Ego | May 18, 1943 |
| 2,477,994 | Love | Aug. 2, 1949 |